(12) United States Patent
Silver et al.

(10) Patent No.: US 11,261,830 B2
(45) Date of Patent: Mar. 1, 2022

(54) STOICHIOMETRIC ENGINE SYSTEM UTILIZING THREE-WAY CATALYST UPSTREAM OF TURBINE

(71) Applicant: Caterpillar Inc., Deerfield, IL (US)

(72) Inventors: Ronald Silver, Peoria, IL (US);
Jaswinder Singh, Dunlap, IL (US);
David M. Ginter, Peoria, IL (US);
Paul Wang, Peoria, IL (US); Michael Bardell, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 22 days.

(21) Appl. No.: 16/531,463

(22) Filed: Aug. 5, 2019

(65) Prior Publication Data
US 2021/0040922 A1 Feb. 11, 2021

(51) Int. Cl.
*F02M 26/35* (2016.01)
*F02M 26/05* (2016.01)
*F01N 3/10* (2006.01)
*F02M 26/23* (2016.01)
*F02M 26/46* (2016.01)
*F02M 26/15* (2016.01)
*F02M 26/00* (2016.01)

(52) U.S. Cl.
CPC ............ *F02M 26/35* (2016.02); *F01N 3/101* (2013.01); *F02M 26/05* (2016.02); *F02M 26/15* (2016.02); *F02M 26/23* (2016.02); *F02M 26/46* (2016.02); *F02M 2026/009* (2016.02)

(58) Field of Classification Search
CPC ........ F02M 26/35; F02M 26/06; F02M 26/05; F02M 26/15; F02M 26/23; F02M 26/46; F02M 2026/009; F01N 3/101
See application file for complete search history.

(56) References Cited

U.S. PATENT DOCUMENTS 6,301,888 B1 * 10/2001 Gray, Jr. ................. F01N 3/023
60/605.2
6,651,432 B1 * 11/2003 Gray, Jr. ................. F02B 37/14
60/605.2

(Continued)

FOREIGN PATENT DOCUMENTS

DE 102016204139 B4 9/2017
JP 2007231792 A 9/2007

*Primary Examiner* — Jesse S Bogue
(74) *Attorney, Agent, or Firm* — Leydig, Voit & Mayer, Ltd.

(57) ABSTRACT

The present disclosure relates to exhaust treatment systems and engine systems. In one implementation, an engine system comprises an engine comprising an intake manifold and an exhaust manifold, the engine configured to combust a fuel-air mixture received via the intake manifold and produce a flow of exhaust gases via the exhaust manifold. The engine system also comprises a turbocharger comprising a turbine, an exhaust passageway fluidly connecting the exhaust manifold of the engine to the turbine and an intake passageway fluidly connected to the intake manifold of the engine for supplying the fuel-air mixture, a catalyzed member positioned along the exhaust passageway between the engine and the turbine, and an exhaust gas recirculation (EGR) loop fluidly connected downstream of the catalyzed member and fluidly connected to the exhaust passageway and the intake passageway.

15 Claims, 4 Drawing Sheets

(56) References Cited

U.S. PATENT DOCUMENTS

| | | | |
|---|---|---|---|
| 6,857,263 B2* | 2/2005 | Gray, Jr | F02B 29/0418 |
| | | | 60/278 |
| 7,025,042 B2* | 4/2006 | Gray, Jr. | F02B 1/12 |
| | | | 123/435 |
| 7,047,933 B2* | 5/2006 | Gray, Jr. | F02D 41/144 |
| | | | 123/305 |
| 8,065,990 B2* | 11/2011 | Brusstar | F02M 57/025 |
| | | | 123/568.11 |
| 8,146,347 B2* | 4/2012 | Odendall | F01N 3/0842 |
| | | | 60/285 |
| 8,516,799 B2* | 8/2013 | Hepburn | F01N 3/10 |
| | | | 60/286 |
| 8,966,885 B2 | 3/2015 | Flynn | |
| 9,003,781 B2 | 4/2015 | Murphy | |
| 9,157,356 B2 | 10/2015 | Daimler | |
| 2009/0077954 A1 | 3/2009 | Winsor et al. | |
| 2010/0132680 A1* | 6/2010 | Iwahashi | F02D 41/1494 |
| | | | 123/697 |
| 2015/0078975 A1 | 3/2015 | Mahakul | |
| 2016/0251996 A1* | 9/2016 | Kano | F01N 11/007 |
| | | | 73/114.75 |

* cited by examiner

STOICHIOMETRIC ENGINE SYSTEM UTILIZING THREE-WAY CATALYST UPSTREAM OF TURBINE

TECHNICAL FIELD

The present disclosure is directed to a stoichiometric engine system and exhaust system, and more particularly, to a stoichiometric system utilizing recirculated exhaust gas.

BACKGROUND

Internal combustion engines, including diesel engines, gasoline engines, natural gas engines, and other engines known in the art exhaust a complex mixture of emissions and/or air pollutants. The emissions are composed of solid particulate matter and gaseous compounds including nitrous oxides (NOx) and carbon monoxide (CO). In addition, some types of fuels such as, for example, diesel fuels often contain sulfur that, at times, convert to potentially corrosive and environmentally unfriendly byproducts. Due to increased attention on the environment, exhaust emission standards have become more stringent, and the amount of solid particulate matter and gaseous compounds emitted to the atmosphere from an engine is regulated depending on the type of engine, size of engine, and/or class of engine.

DE1020162041394 to Wolfgang et al. a method for operating an internal combustion engine assembly. In the disclosed method, methane-containing combustion gas that is combusted in the first combustion chamber with excess air to form oxygen-containing combustion case. The oxygen-containing combustion gas from the first combustion chamber is provide to a turbine and then to a second combustion chamber. The oxygen-containing combustion gas in the second combustion chamber is implemented as stoichiometric combustion. Exhaust gas from the second combustion chamber is applied to a three-way catalyst, while a partial flow of exhaust gas from the second combustion chamber is dropped is provided to a turbine. That is, DE1020162041394 discloses an engine operating mainly in a lean combustion operation and adds a stoichiometric combustion chamber downstream. Exhaust from the stoichiometric combustion chamber flows through a three-way in a pre-, mid- or post turbine location.

The present disclosure is directed toward overcoming one or more of the problems discovered by the inventors.

SUMMARY

An engine system is disclosed herein. The engine system comprises an engine comprising an intake manifold and an exhaust manifold, the engine configured to combust a fuel-air mixture received via the intake manifold and produce a flow of exhaust gases via the exhaust manifold. The engine system also comprises a turbocharger comprising a turbine, an exhaust passageway fluidly connecting the exhaust manifold of the engine to the turbine and an intake passageway fluidly connected to the intake manifold of the engine for supplying the fuel-air mixture, a catalyzed member positioned along the exhaust passageway between the engine and the turbine, and an exhaust gas recirculation (EGR) loop fluidly connected downstream of the catalyzed member and fluidly connected to the exhaust passageway and the intake passageway.

In another aspect, a method for operating an engine is disclosed herein. The method comprises combusting a fuel-air mixture and producing a flow of exhaust to a turbine of a turbocharger via an exhaust passageway and directing the flow of exhaust through a catalyzed member prior to providing the flow of exhaust to the turbine, wherein the catalyzed member reduces emissions included in the flow of exhaust. The method also comprises controlling an air-to-fuel ratio of the fuel-air mixture based on emissions in the flow of exhaust following the catalyzed member to maintain the air-to-fuel ratio within a predetermined range of a stoichiometric point.

In yet another aspect, an exhaust treatment system is disclosed herein. The exhaust system comprises an exhaust passageway configured to receive a flow of exhaust based on combustion of a fuel-air mixture and a turbocharger comprising a turbine and a compressor. The turbine is configured to receive the flow of exhaust from the exhaust passageway and to induce rotation of the compressor based on the received flow of exhaust. The exhaust system also comprises a catalyzed member positioned along the exhaust passageway upstream of the turbine and configured to reduce emissions in the flow of exhaust prior to reception by the turbine, and a control module comprising a memory storing instruction for operating the exhaust system and a processor coupled to the memory. The processor is configured to execute the instructions to control an air-to-fuel ratio of the fuel-air mixture based on emissions in the flow of exhaust following the catalyzed member to maintain the air-to-fuel ratio within a predetermined range of a stoichiometric point.

BRIEF DESCRIPTION OF THE FIGURES

The details of embodiments of the present disclosure, both as to their structure and operation, may be gleaned in part by study of the accompanying drawings, in which like reference numerals refer to like parts, and in which.

DETAILED DESCRIPTION

The detailed description set forth below, in connection with the accompanying drawings, is intended as a description of various embodiments and is not intended to represent the only embodiments in which the disclosure may be practiced. The detailed description includes specific details for the purpose of providing a thorough understanding of the embodiments. However, it will be apparent that those skilled in the art will be able to understand the disclosure without these specific details. In some instances, well-known structures and components are shown in simplified form for brevity of description. Some of the surfaces have been left out or exaggerated for clarity and ease of explanation.

Figure 1:
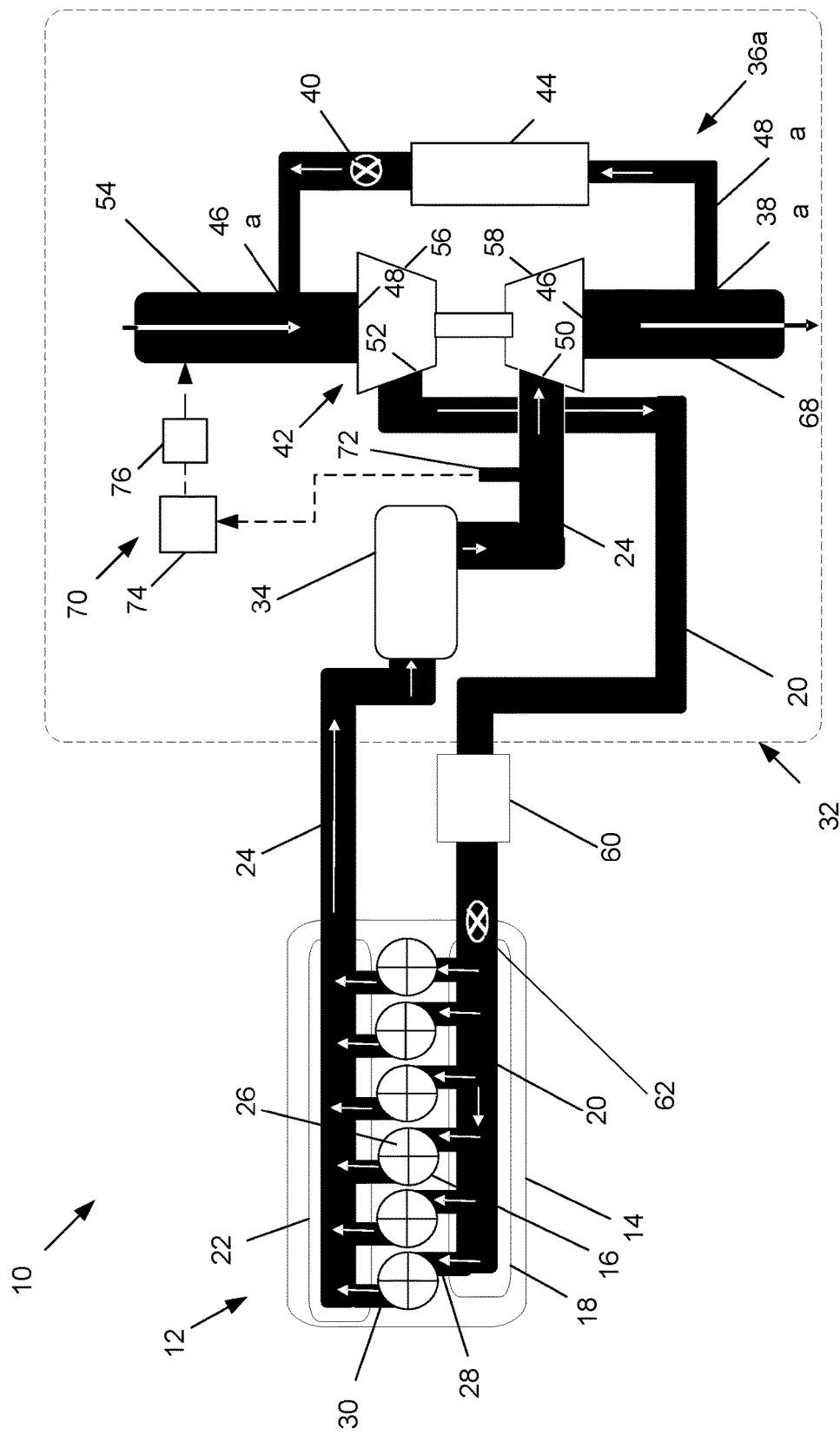
FIG. 1 is a schematic illustration of an example engine system in accordance with embodiments disclosed herein.

FIG. 1 illustrates an exemplary engine system 10 having an engine 12 that combusts a mixture of air and fuel (referred to herein as fuel-air mixture) to generate a mechanical output and a flow of exhaust. In the illustrated example, engine 12 is depicted and described as a natural gas powered engine. However, engine 12 may be any type of internal combustion engine such as, for example, another gaseous fuel-powered engine, a gasoline engine, a four-stroke diesel engine, or any engine capable of being powered by a petroleum based or non-petroleum based fuel. Engine 12 may be utilized for any application, including but not limited to, generating electric power, marine, or rail applications, operating a machine or equipment.

Engine 12 may operate at different air-to-fuel ratios (AFR), which is a measure of the ratio of the mass air to the mass of fuel present in engine 12. The AFR for a fuel-air mixture may be expressed as a lambda (λ) value, which is equal to the ratio of AFR of the fuel-air mixture to the stoichiometric air-to-fuel ratio ($AFR_{Stoich}$) of a fuel-air mixture. The stoichiometric fuel-air mixture corresponds to a chemically accurate fuel-air mixture for stoichiometric combustion to occur in the engine 12, that is, an ideal ratio of air to fuel such that all fuel burns with no excess air. During a stoichiometric operation of the engine 12, λ is equal to 1.0. The engine 12 may also operate in non-stoichiometric modes, for example, rich or a lean. Particularly, when the engine 12 is operating rich, λ is less than 1.0 and a higher level of fuel is present than needed for stoichiometric combustion. Relative to lean burn operation, pure stoichiometric operation without any exhaust gas recirculation (EGR) may be less efficient and produce lower power because of temperature limit imposed by hotter combustion. Conversely, when the engine 12 is operating lean, λ is greater than 1.0 and a lower level of fuel is present than needed for stoichiometric combustion. Operating lean may be more efficient and may produce more power for a given engine hardware set because the combustion is cooler due to the presence of excess air. Cooler combustion temperatures can also reduce exhaust emissions of oxides of nitrogen (e.g. NOx). EGR may be added to the fuel-air mixture to reduce combustion temperatures and NOx emissions and to enable use of a three-way catalyst, that helps reduce emissions of carbon monoxide (CO), unburned hydrocarbons (HC), and NOx emissions.

Engine 12 may include an engine block 14 comprising a plurality of cylinders 16, an intake manifold 18 fluidly connecting cylinders 16 to an intake passageway 20 for supplying a fuel-air mixture to the engine 12, and an exhaust manifold 22 fluidly connecting cylinders 16 to an exhaust passageway 24. A piston (not shown) may be slidably disposed within each cylinder 16 to reciprocate between a top-dead-center position and a bottom-dead-center position, and a cylinder head (not shown) may be associated with each cylinder 16.

Cylinder 16, the piston, and the cylinder head may form a combustion chamber 26 fluidly connected to intake manifold 18 and exhaust manifold 22 via fluid passageways 28 and 30, respectively. In the illustrated embodiment, engine 12 includes six such combustion chambers 26. However, engine 12 may include a greater or lesser number of combustion chambers 26 and that combustion chambers 26 may be disposed in an "in-line" configuration, a "V" configuration, or in any other suitable configuration.

Engine system 10 can further include a turbocharger 42 having a compressor 56 and a turbine 58, structured to compress and supply a fluid such as the fuel-air-exhaust mixture, to engine 12. Exhaust passageway 24 may be connected to turbine 58 at port 50 and fluidly connect the turbine 58 to exhaust manifold 22. Intake passageway 20 be connected to compressor 56 at inlet port 52 and fluidly connect the compressor 56 to intake manifold 18. The turbine 58 may receive exhaust gases from the exhaust manifold 22 and output exhaust gases through port 46 via exhaust outlet passage way 68. Turbine 58 may rotate to induce rotation of compressors 56 to provide a flow of fuel-air-exhaust to engine 12, which may be added to fluid received by the compressor 56 at port 48 via fluid supply passageway 54. Fluid supply passageway 54 receives fluid, for example, the fuel-air-exhaust mixture, to be supplied to the engine 12.

An after cooler 60 may be positioned fluidly between compressors 56 and engine 12 along intake passageway 20. The after cooler 60 may receive streams of compressed fluid from compressor 56 via intake passageway 20 and decrease the thermal energy of the compressed fluid for feeding to the engine 12. The after cooler 60 may include a liquid-to-air heat exchanger, an air-to-air heat exchanger, or any other type of heat exchanger known in the art for cooling an intake fluid flow. A throttle 62 may be positioned within the intake passageway 20 downstream of the after cooler 60 and fluidly between the after cooler 60 and the intake manifold 18. The throttle 62 may be used to selectively restrict intake fluid flow through intake passageway 20, and therefore, to the engine 12. Throttle 62 may include any type of valve such as, for example, a butterfly valve, a diaphragm valve, a gate valve, a ball valve, a globe valve, or any other valve known in the art. The valve of throttle 60 may be solenoid-actuated, hydraulically-actuated, pneumatically-actuated or actuated in any other manner to Engine system 10 may also include an exhaust treatment system 32 for removing and/or reducing the emissions in the exhaust produced by engine 12 and released into the atmosphere. Exhaust treatment system 32 may include a catalyzed member 34 situated along exhaust passageway 24 and upstream of the turbine 58 and an exhaust gas recirculating (EGR) loop, for example EGR loop 36a, for directing a predetermined portion of exhaust back to intake passageway 20 of engine 12. As a result of being positioned upstream of the turbine 58, the catalyzed member 34 and the exhaust passageway 24 may be exposed to a high pressure and high temperature environment. Whereas, conventional engine systems generally provide a catalyzed member and EGR loop downstream of the turbine due to, for example, the lack of mechanical vibration robustness of the catalyst support or the need to maintain rapid turbine response for transient operation.

Catalyzed member 34 may include a structure coated with or otherwise containing a three-way catalyst to reduce the by-products of combustion. The catalyzed member 34 may support the reduction of particulate matter, hydrocarbons (HC) (also sometimes referred to herein as total carbon), carbon monoxide (CO), and nitric oxide (NO) and nitric dioxide ($NO_2$) (collectively referred to herein as NOx). In various embodiments, the structure of the catalyzed member 34 may be a metallic substrate coated with the three-way catalyst, for example, to support the reduction of the above elements. The metallic substrate may be provided in a honeycomb structure. The three-way catalyst coating of the catalyzed member 34 may include, for example, a base metal oxide or a precious metal that catalytically reacts with particulate matter, CO, and NOx according to the above reactions. In various embodiments, the metal substrate utilized for the catalyzed member 34 may be based on anticipated temperatures within the exhaust passageway 24 and can be coated with a catalyst. One non-limiting example of a metal substrate is FeCrAlY, which has high heat tolerance and is very coatable. Utilizing a metallic substrate having a lower cell density may, for example, reduce and/or minimize flow restriction. The catalyzed member 34 may include a catalyst comprised of one or more precious metals including, for example, platinum, palladium, and/or rhodium etc., which may facilitate simultaneous oxidation of CO and hydrocarbons plus reduction of NOx into carbon dioxide, water, and $N_2$.

Reduction of particulate matter, HC, CO, and NOx may be most efficiently when the catalyzed member 34 receives exhaust via exhaust passageway 24 from engine 12 running within a narrow range of stoichiometric combustion. Thus, catalyzed member 34 may be effective when the engine 12 is operated within a narrow range of $\lambda$ values near the stoichiometric point (e.g., $\lambda$ value of 1), for example, between $\lambda$ values of 0.99 and 1.01. It may be desirable to run engine 12 with a fuel-air mixture having an AFR that corresponds to higher $\lambda$ values; however, reaction efficiencies and NOx conversion may fall very rapidly when the engine is operated above 1.01 of the stoichiometric point. When engine 12 is operated lean, exhaust contains excess oxygen, and the reduction of NOx is not favored. While, operating rich, the excess fuel consumes all of the available oxygen prior to the catalyzed member 34, with the result being an incomplete conversion of CO and HC.

The EGR loop may include components arranged to redirect a portion of the exhaust from the exhaust manifold 22 back into engine 12 via the intake manifold 18. In the illustrated example, the EGR loop may be a low pressure EGR loop 36a having an EGR cooler 44 fluidly connected downstream of the turbine 58 and upstream of the compressor 56. EGR cooler 44 may be configured to cool the exhaust flowing from the exhaust outlet passageway 68, through EGR loop 36a, and into the fluid supply passageway 54. EGR cooler 44 may include a liquid-to-air heat exchanger, an air-to-air heat exchanger, or any other type of heat exchanger known in the art for cooling an exhaust flow. The EGR cooler 44 may be fluidly connected to exhaust outlet passageway 68 and to the fluid supply passageway 54 via EGR passageway 48a. An inlet port 38a downstream of the turbine 58 may fluidly connect the exhaust outlet passageway 68 to the EGR fluid passageway 48a and a discharge port 46a upstream of the compressor 56 may fluidly connect the EGR fluid passageway 48a to the fluid supply passageway 54. The EGR loop 36a may also include a recirculation valve 40 disposed within fluid passageway 48a, between the EGR cooler 44 and discharge port 46a. It is contemplated that inlet port 38a may be located upstream or downstream of any additional emission control devices (not shown) disposed within exhaust passageway 24 such as, for example, particulate filters and/or other catalytic devices.

Recirculation valve 40 may be located to regulate the flow of exhaust through EGR loop 36a. Recirculation valve 40 may be any type of valve such as, for example, a butterfly valve, a diaphragm valve, a gate valve, a ball valve, a globe valve, or any other valve known in the art. In addition, recirculation valve 40 may be solenoid-actuated, hydraulically-actuated, pneumatically-actuated or actuated in any other manner to selectively restrict the flow of exhaust through fluid passageway 48a.

Engine system 10 may also include a feedback control system 70 for controlling operation of the engine 12. Feedback control system 70 may include a sensor 72, a control module (CM) 74 (sometimes referred to herein as an engine control module or ECM), and an air-fuel regulator 76. For example, feedback control system 70 may be provided for controlling the AFR of a fuel-air mixture provided to engine 12 via fluid supply passageway 54 so to maintain operation of engine 12 within the desirable range of $\lambda$ values near the stoichiometric point.

The sensor 72 may be positioned along exhaust passageway 24 and between the catalyzed member 34 and turbine 58 and communicatively coupled (either wired or wirelessly) to the CM 74. The sensor 72 contacts fluid within exhaust passageway 24 and detects pollutants therein following the catalyzed member 34, for example, particulate matter following reactions in performed in the catalyzed member 34. The sensor 72 may be one or more sensors of the same or different types. For example, the sensor 72 may comprise an oxygen sensor operable to measure oxygen content in the exhaust passageway 24 that exits from the catalyzed member 34 and generate an oxygen detection signal for the same, which may be communicated to the CM 74. In another example, alone or in combination, sensor 72 may comprise a NOx sensor operable to measure a current NOx value in the exhaust passageway 24 and generates a NOx detection signal, which may be communicated to the CM 74.

The CM 74 may be a processing and controlling unit comprising a memory storing instructions and a processor configured to execute the instructions. The instructions may be software programmed into the CM 74 for determining an AFR set point value for the fuel-air mixture supplied via fluid supply passageway 54 based on existing operating conditions detected by the sensor 72 and the target AFR for stoichiometric operation and a processor configured to execute the instructions. The CM 74 may be communicatively coupled to an air-fuel regulator 76. The CM 74 may communicate the AFR set point value to an air-fuel regulator 76 which controls a flow of air and fuel to the compressor 56 via fluid supply passageway 54. Examples of the air-fuel regulator 76 may embody, such as but not limited to, a throttle, a control valve, or an injector.

Figure 2:
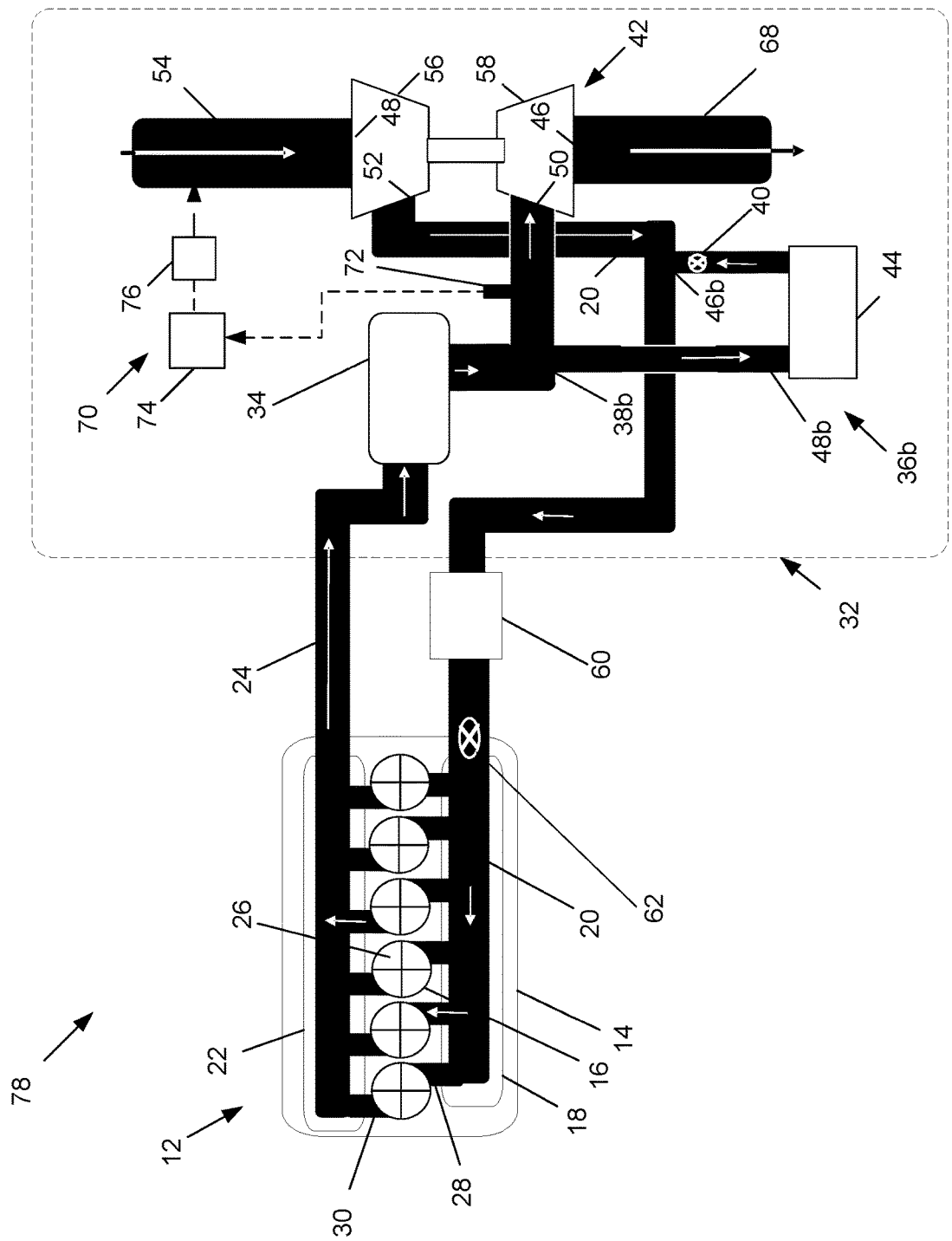
FIG. 2 is a schematic illustration of another example engine system in accordance with embodiments disclosed herein.

FIG. 2 illustrates another embodiment of engine system 78 that positions catalyzed member 34 upstream of turbocharger 42. The engine system 78 is substantially similar to engine system 10 of FIG. 1, except that the exhaust treatment system 32 comprises high pressure EGR loop 36b. EGR loop 36b includes EGR cooler 44 fluidly connected upstream of the turbine 58 and downstream of the compressor 56. EGR cooler 44 may be configured to cool the exhaust flowing from the exhaust passageway 24, through EGR loop 36a, and into the intake passageway 20. The EGR cooler 44 may be fluidly connected to exhaust passageway 24 and to the intake passageway 20 via EGR passageway 48b. An inlet port 38b upstream of the turbine 58 along exhaust passageway 24 may fluidly connect the EGR loop passageway 48b to exhaust passageway 24 and a discharge port 46b downstream of the compressor 56 may fluidly connect the EGR loop passageway 48b to the intake passageway 20. The EGR loop 36b may also include recirculation valve 40 disposed within fluid passageway 48b, between the EGR cooler 44 and discharge port 46b. It is contemplated that inlet port 38b may be located upstream or downstream of any additional emission control devices (not shown) disposed within exhaust passageway 24 such as, for example, particulate filters and/or other catalytic devices.

The single turbocharger 42 illustrated in FIGS. 1 and 2 is for illustrative purposes only, multiple sequential or non-sequential turbocharger designs, or still other arrangements are contemplated within the disclosure herein.

INDUSTRIAL APPLICABILITY

Various engines used in engine systems, and particularly, natural gas fueled engines, may need to meet stringent emissions requirements, including limits on NOx, carbon monoxide (CO), total carbon (e.g., hydrocarbons or HC), and ammonia (e.g., $NH_3$) in non-automotive applications. By running an engine near the stoichiometric point with cooled or clean EGR, and providing a three-way catalyst in the exhaust line, NOx, CO and HC may be reduced or removed from the engine exhaust. Generally it is desirable to run such engines for thousands of hours at rated conditions. However, after just a few thousand hours of operation of conventional engines having the three-way catalyst downstream of a turbine, the three-way catalyst loses enough of the catalyst such that reaction activity and conversions no longer meets emission requirements. Additionally, three-way catalysts produce ammonia during operation as a byproduct of the reactions that reduce NOx, CO and HC. Such byproducts can be difficult to keep below a level that still meets ammonia regulations. Furthermore, it may be desirable to recirculate some of the exhaust gas in an EGR loop and to cool the recirculating gas below the dew point prior to re-introducing into the engine. However, there is a risk of acid (e.g., $HNO_3$ or nitric acid) formation when the gas is cooled, which may result in subsequent damage to the cooler.

The engine systems disclosed herein (e.g., engine systems 10 and 78) may reliably and efficiently remove or reduce pollutant emissions from exhaust that are released into the atmosphere. In particular, the combination of catalyzed member 34 having a three-way catalyst and EGR loop 36, as described above in connection with FIGS. 1 and 2, may effectively reduce or remove NOx, hydrocarbons, and carbon monoxide from the engine exhaust. By utilizing the catalyzed member 34 positioned upstream of the turbocharger (e.g., in the higher temperature and higher pressure environment) and running engine 12 at $\lambda$ values within a narrow band near the stoichiometric point numerous advantages are realized.

For example, the catalyzed member 34 is capable of utilizing higher temperature within exhaust passageway 24 prior to the turbocharger 42, which allows an aging catalyzed member 34 to continue to meet emission targets for longer periods of time of operation. However, throughout its life cycle, an aging catalyzed member 34 may shift the optimum $\lambda$ value over time (e.g., to richer mode of operation). Thus, the operation of engine 12 is changed to match the shift in optimum $\lambda$ value and the catalyzed member 34 can continue to meet all emissions targets for a much longer period of usage as compared to conventional engines having a catalyzed member downstream of a turbo but which operates at a lower temperature.

Figure 3:
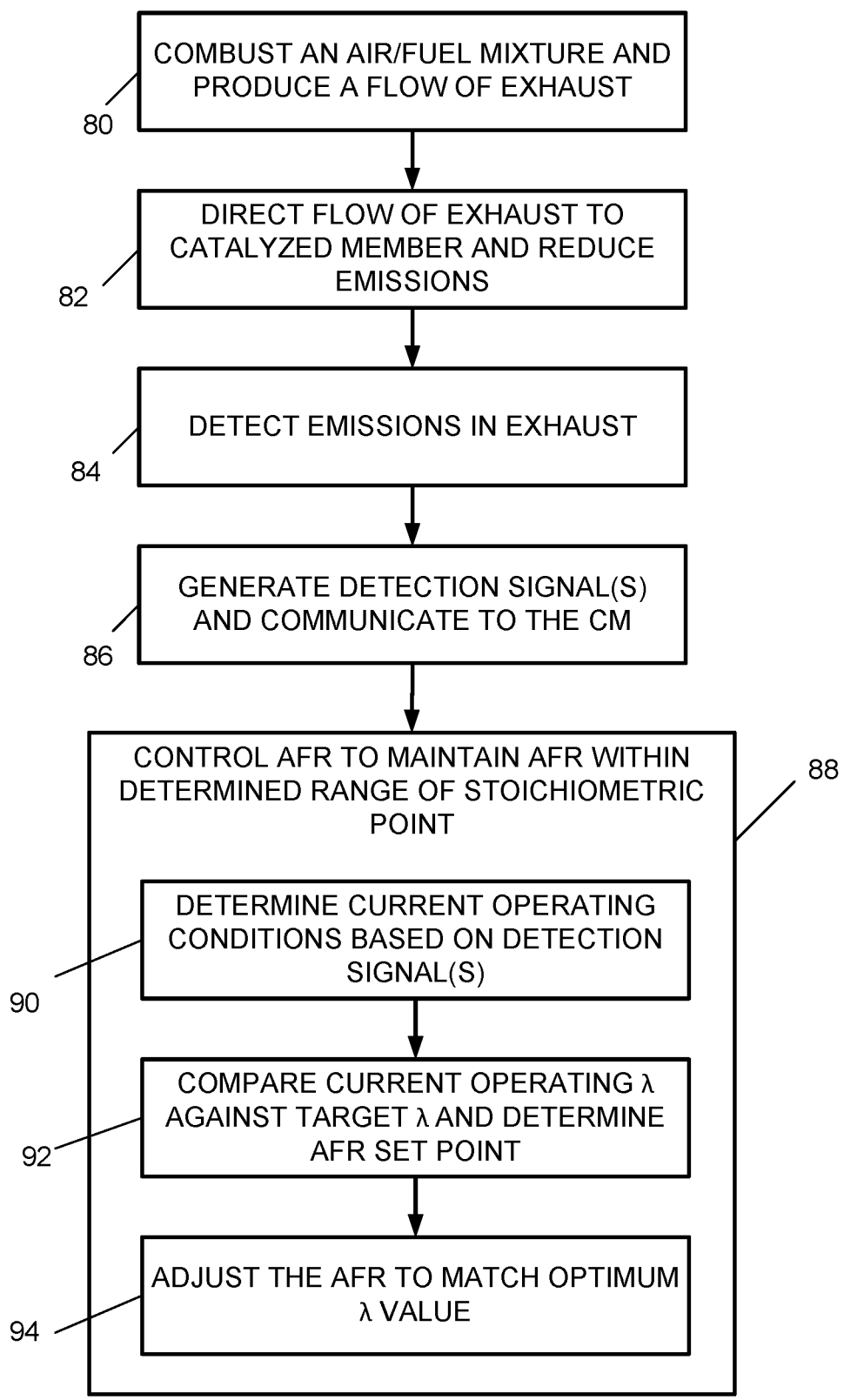
FIG. 3 illustrates an example flow chart of a method for operating engine systems in accordance with the embodiments disclosed herein.

FIG. 3 illustrates an example flow chart of a method for operating the engine systems 10 and 78 so to account for the shift in optimum $\lambda$ value. The example method of FIG. 3 may be performed using the feedback control system 70 for controlling the operation of the engine 12, and more particularly for controlling AFR of the fuel-air mixture to ensure operation of engine 12 within the desirably range of $\lambda$ values near a shift stoichiometric point. The engine 12 may operate to combust a fuel-air mixture and produce a flow of exhaust that is provided to turbine 58 via exhaust passageway 24 (block 80). The catalyzed member 34 may be provided in accordance with embodiments described herein, that is, upstream of the turbine 58 to treat the exhaust and reduce pollutant emissions in the exhaust passageway 24 (block 82). Sensor(s) 72 detect contents within exhaust passageway 24 downstream of the catalyzed member 34 (block 84), for example, particulate matter, following reactions that are performed in the catalyzed member 34. The sensor(s) 72 may detect particulate matter such as, but not limited to, oxygen, NOx, and/or other emissions and measure the amount of each included in the exhaust passageway 24 that exits from the catalyzed member 34. The sensor(s) 72 generate one or more detection signals indicative of the detected contents, which are communicated to the CM 74 (block 86). The CM 74 is adapted to receive the detection signals from the sensor 72 and control the AFR of the fuel-air mixture supplied to the engine so to maintain the AFR within a desired or predetermined range of the stoichiometric air-to-fuel ratio (e.g., stoichiometric point) based on the treated exhaust (block 88). In this regard, the CM 74 may be configured to determine the current operating conditions based on the detection signal (e.g., values of oxygen and/or NOx) in the exhaust passageway 24 (block 90). The current operating conditions are used to determine a current $\lambda$ value of operation. The CM 74 compares the $\lambda$ value against a target $\lambda$ value (e.g., the stoichiometric point) and determines an AFR set point value for the air-fuel regulator 76 such that the current $\lambda$ value matches the target $\lambda$ value (block 92). The CM 74 sends a signal to the air-fuel regulator 76 to adjust the AFR of the fuel-air mixture, thereby shifting the operating mode of the engine 12 to match any shifts in optimum $\lambda$ values for the aging catalyzed member 34 (block 94).

Additionally, operating the catalyzed member 34 in the higher temperature environment in accordance with the method described in FIG. 3 may reduce the need for dithering of engine 12 between rich and lean operation. That is, utilizing the feedback control system 70 to maintain the $\lambda$ value for operating the engine 12 within a narrow band of $\lambda$ values near the stoichiometric point, the conversions within the catalyzed member 34 may be maintained and the engine 12. The present invention allows AFR control with or without dithering between rich and lean operation.

Another non-limiting advantage of embodiments disclosed herein is a reduction in the ammonia produced by the catalyzed member 34. Typically, three-way catalysts form unwanted ammonia as a byproduct of reaction between NO and $H_2$. This ammonia is a problem if the amount of ammonia is to be regulated. Locating the catalyzed member 34 in the higher pressure and higher temperature environment of the exhaust passageway 24 upstream of the turbine 58 may reduce the amount of ammonia formed by the catalyzed member 34 and meet ammonia formation limits. This reduction in ammonia formation may also allow the engine 12 to utilize a wider band of $\lambda$ values for efficient operation of the catalyzed member 34.

Figure 4:
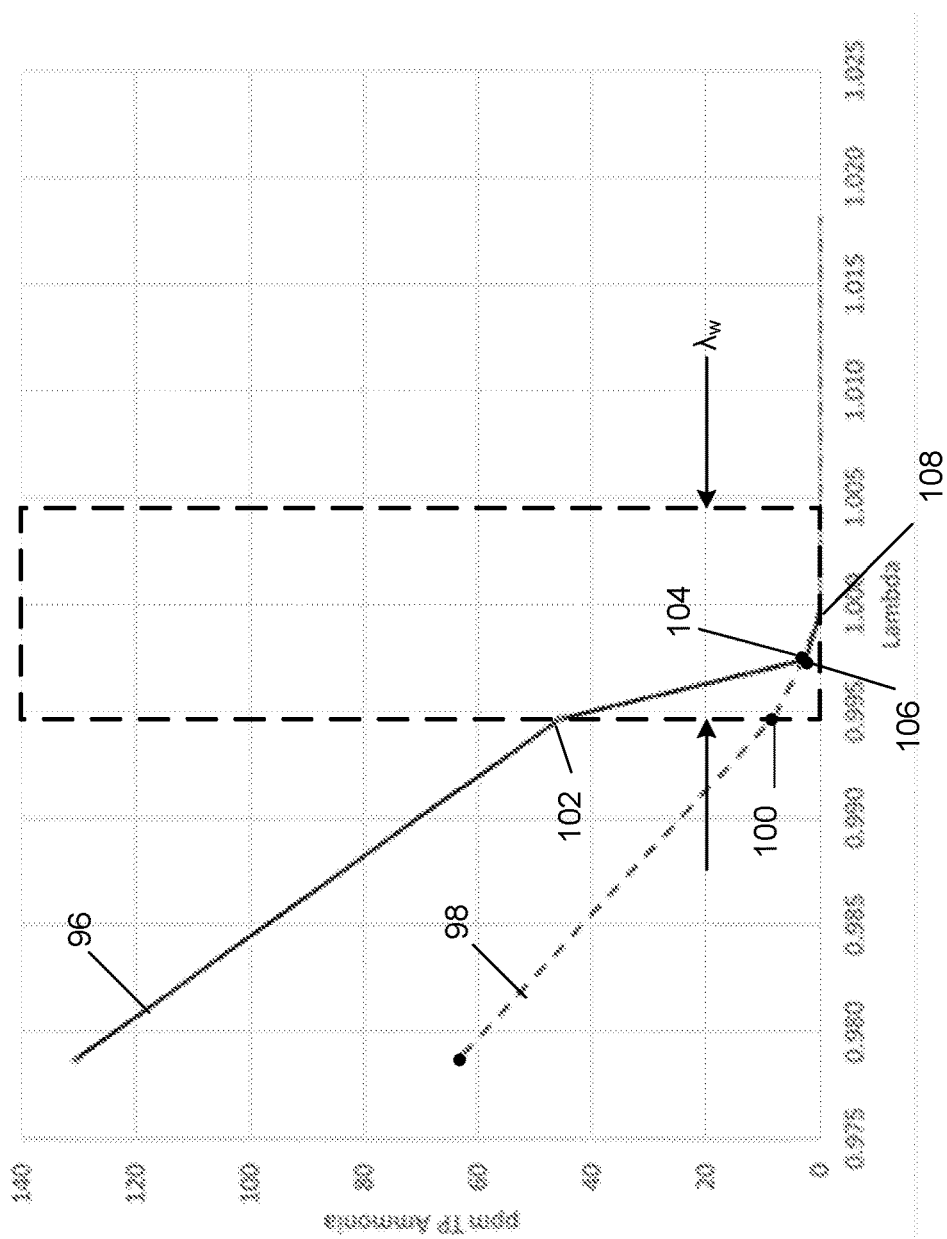
FIG. 4 is a graph of simulated ammonia formation in exhaust from a convention engine compared to engine systems in accordance with embodiments disclosed herein.

For example, FIG. 4 illustrates a graph of simulated ammonia formation in the catalyst as a function of $\lambda$ in a conventional engine as compared to embodiments disclosed herein. FIG. 4 depicts two curves graphically illustrating parts per million (ppm) of ammonia formed in exhaust output simulated using conventional engines (e.g., engines having a three-way catalyst downstream of or post to a turbocharger) and embodiments herein (e.g., engines having catalyzed member 34 provided upstream of the turbine 58, as in FIGS. 1 and 2) operated at various $\lambda$ values. Curve 96 (illustrated as a solid curve) illustrates the results for a conventional engine and curve 98 (illustrated as a dashed curve) illustrates the results for the embodiments described herein. As illustrated in FIG. 4, curve 98 results in lower ammonia formation than curve 96 for numerous $\lambda<1$ values. The curves 96 and 98 begin to converge at points 104, 106, respectively, at which point the ammonia formation is similar in both curves and the two lines merge at stoichiometric point 108.

In various applications of engine systems, ammonia formation may be regulated, for example, ammonia emissions limits can be 10 part per million (ppm) or less. As illustrated in FIG. 4, curve 98 reaches 10 ppm when operated at a $\lambda$ value of 0.995 (point 100) of the of the stoichiometric point 108, while curve 96 is still above 40 ppm (point 102) and does not reach 10 ppm until much closer to the stoichiometric point 108. As described above, catalyzed member 34 may be effective when the engine 12 is operated within a narrow range of λ values, that is between λ values of 0.99 and 1.01. Thus, the reduced formation of ammonia allows the catalyzed member 34 to utilize a larger window of optimum λ values (λw) for efficient conversion of emissions as compared to the conventional engines of curve 96. That is, the engine systems disclosed herein may be able to utilize λ values between 0.995 and 1.01 while continuing to meet stringent emission requirements, while conventional systems may only be able to utilize λ values between 0.997 and 1.01. The wider range of optimum λ values for efficient operation of the catalyzed member 34 may also provide for simpler control and more forgiving operating space and may provide for a reduction in the excess amount of oxygen stored by the catalyzed member 34 necessary for efficiency of reactions.

Furthermore, as described above, the catalyzed member 34 comprises a structure to support the reduction of NO from the exhaust manifold 22 in the exhaust passageway 24. Thus, reduction in NO may result in a reduction of the formation of nitric acid (e.g., $HNO_3$) downstream of the catalyzed member 34. By positioning the catalyzed member 34 upstream of the turbine 58, the turbine 58 will be exposed to less nitric acid than in conventional engines. Additionally, locating the EGR loop 36 downstream of the catalyzed member 34 results in a lowered risk of acid formation in the EGR loop 36 and the intake system (e.g., compressor 56, intake passageway 20, intake manifold 18, after cooler 60, etc.) due to the reduction of NOx following the catalyzed member 34. Thus, the EGR loop 36 can be operated as either high-pressure EGR loop 36a of FIG. 1 or low-pressure EGR loop 36b of FIG. 2.

In view of the above, by positioning a catalyzed member 34 having a metallic substrate coated with a three-way catalyst upstream of the turbine 58, particulate matter and other emissions may be removed or reduced from the exhaust before passed to downstream components. Therefore, an aging system may be powered by various petroleum based or non-petroleum based fuels and continue to meet stringent emissions standards.

Although this invention has been shown and described with respect to detailed embodiments and examples thereof, it will be understood by those skilled in the art that various changes in form and detail thereof may be made without departing from the spirit and scope of the claimed invention. Accordingly, the preceding detailed description is merely exemplary in nature and is not intended to limit the invention or the application and uses of the invention. In particular, the described embodiments are not limited to use in conjunction with a particular type of engine. For example, the described embodiments may be applied to generators, engines, machinery, equipment, or any variant thereof. Furthermore, there is no intention to be bound by any theory presented in any preceding section. It is also understood that the illustrations may include exaggerated dimensions and graphical representation to better illustrate the referenced items shown, and are not consider limiting unless expressly stated as such.

It will be understood that the benefits and advantages described above may relate to one embodiment or may relate to several embodiments. It is appreciated that features shown or discussed in one embodiment or example can be combined with other features shown or discussed in other embodiments and examples. The embodiments are not limited to those that solve any or all of the stated problems or those that have any or all of the stated benefits and advantages.

What is claimed is:

1. An engine system, comprising:
   an engine comprising an intake manifold and an exhaust manifold, the engine configured to combust a fuel-air mixture received via the intake manifold and produce a flow of exhaust gases via the exhaust manifold;
   a turbocharger comprising a turbine;
   an exhaust passageway fluidly connecting the exhaust manifold of the engine to the turbine and an intake passageway fluidly connected to the intake manifold of the engine for supplying the fuel-air mixture;
   a catalyzed member that includes a metal substrate that is adapted to trap particulate matter therein from exhaust gas passing through the exhaust passageway during engine operation, the metal substrate being coated with a three-way catalyst, the catalyzed member positioned along the exhaust passageway between the engine and the turbine;
   a control module associated with the engine;
   a single exhaust gas sensor disposed along the exhaust passageway, the single exhaust gas sensor positioned between the catalyzed member and the turbine, the single exhaust gas sensor operating to detect constituents of exhaust gas exiting the catalyzed member, the single exhaust gas sensor being communicatively coupled to the control module and operating to provide one or more signals to the control module that are indicative of the detected constituents of exhaust gas exiting the catalyzed member;
   an air-fuel regulator disposed along the intake passageway, the air-fuel regulator being communicatively coupled to the control module and operating to control and air-fuel mixture provided to the engine, the air-fuel mixture being provided at an air-fuel ratio (AFR) that is controlled by the air-fuel regulator to be within a desirable range in response to commands provided by the control module, wherein the commands provided by the control module are based on an AFR set point value that is determined by the control module based primarily on the one or more signals provided to the control module from the single exhaust gas sensor; and
   an exhaust gas recirculation (EGR) loop fluidly connected downstream of the catalyzed member and fluidly connected to the exhaust passageway and the intake passageway.

2. The engine system of claim 1, wherein the metal substrate of the catalyzed member comprises a metallic structure coated with the three-way catalyst.

3. The engine system of claim 2, wherein the metallic structure is a honeycomb structure.

4. The engine system of claim 1, wherein the turbocharger comprises a compressor fluidly connected between a fluid supply passageway for receiving the fuel-air mixture and the intake passageway and the turbine is fluidly connected between the exhaust passageway and an exhaust outlet passageway to output the exhaust gases, wherein the EGR loop comprises an EGR passageway fluidly connected along the exhaust outlet passageway at an inlet port downstream of the turbine and fluidly connected along the fluid supply passageway at an outlet port upstream of the compressor.

5. The engine system of claim 4, wherein EGR loop comprises an EGR cooler positioned along the EGR passageway and an EGR valve between the EGR cooler and the outlet port.

6. The engine system of claim 1, wherein the EGR loop is a low pressure EGR loop.

7. A method for operating an engine comprising:
combusting a fuel-air mixture and producing a flow of exhaust to a turbine of a turbocharger via an exhaust passageway;
directing the flow of exhaust through a catalyzed member prior to providing the flow of exhaust to the turbine, wherein the catalyzed member includes a metal substrate that is adapted to trap particulate matter therein from the flow of exhaust gas, the metal substrate being coated with a three-way catalyst that reduces emissions included in the flow of exhaust; and
controlling an air-to-fuel ratio of the fuel-air mixture primarily based on emissions in the flow of exhaust following the catalyzed member to maintain the air-to-fuel ratio within a predetermined range of a stoichiometric point.

8. The method of claim 7, wherein the metal substrate of the catalyzed member comprises a metallic structure coated with a three-way catalyst.

9. The method of claim 7, wherein the catalyzed member reduces hydrocarbons (HC), carbon monoxide (CO), and nitric oxide (NO), and nitric dioxide (NO2) in the exhaust.

10. The method of claim 7, further comprising
detecting emissions in the flow of exhaust following the catalyzed member;
determining current operating conditions based on the detected emissions; and
determining an air-to-fuel ratio set point based on comparing the current operating conditions against a target operating condition.

11. The method of claim 10, further comprising adjusting the air-to-fuel ratio of the fuel-air mixture based on the air-to-fuel ratio set point.

12. An exhaust treatment system, comprising:
an exhaust passageway configured to receive a flow of exhaust based on combustion of a fuel-air mixture;
a turbocharger comprising a turbine and a compressor, the turbine configured to receive the flow of exhaust from the exhaust passageway and to induce rotation of the compressor based on the received flow of exhaust;
a catalyzed member that includes a metal substrate that is adapted to trap particulate matter therein from exhaust gas passing through the exhaust passageway during engine operation, the metal substrate being coated with a three-way catalyst, the catalyzed member positioned along the exhaust passageway upstream of the turbine and configured to reduce emissions in the flow of exhaust prior to reception by the turbine; and
a control module comprising a memory storing instruction for operating the exhaust system and a processor coupled to the memory, the processor configured to execute the instructions to control an air-to-fuel ratio of the fuel-air mixture primarily based on emissions in the flow of exhaust following the catalyzed member to maintain the air-to-fuel ratio within a predetermined range of a stoichiometric point.

13. The exhaust treatment system of claim 12, wherein the metal substrate of the catalyzed member comprises a metallic structure coated with a three-way catalyst.

14. The exhaust treatment system of claim 4, wherein the catalyzed member reduces hydrocarbons (HC), carbon monoxide (CO), and nitric oxide (NO), and nitric dioxide (NO2) in the exhaust.

15. The exhaust treatment system of claim 12, further comprising one or more sensors positioned along the exhaust passageway between the catalyzed member and the turbine, the one or more sensors are configured to detect one or more emissions in the flow of exhaust, wherein the control module is further configured to:
determine current operating conditions based on the detected emissions;
determine an air-to-fuel ratio set point based on comparing the current operating conditions against a target operating condition; and
adjust the air-to-fuel ratio of the fuel-air mixture based on the air-to-fuel ratio set point.

* * * * *